United States Patent [19]

Shpancer et al.

[11] Patent Number: 5,282,204
[45] Date of Patent: Jan. 25, 1994

[54] APPARATUS AND METHOD FOR OVERLAYING DATA ON TRUNKED RADIO

[75] Inventors: Isaac Shpancer, Edina; Jon M. Silverman, Minneapolis; Merv L. Grindahl, Waseca, all of Minn.

[73] Assignee: RACOTEK, Inc., Minneapolis, Minn.

[21] Appl. No.: 869,011

[22] Filed: Apr. 13, 1992

[51] Int. Cl.$^5$ .......................... H04G 7/02; H04J 3/26; H04B 7/26

[52] U.S. Cl. ................................ 370/94.2; 455/54.1; 455/54.2; 370/95.1

[58] Field of Search ..................... 455/53.1, 54.1, 54.2, 455/34.1, 34.2, 57.1, 58.2; 370/95.1, 95.3, 94.1, 94.2

[56] References Cited

U.S. PATENT DOCUMENTS

| | | | |
|---|---|---|---|
| 4,058,672 | 11/1977 | Crager et al. | 178/3 |
| 4,613,990 | 9/1986 | Halpern | 455/33 |
| 4,737,978 | 4/1988 | Burke et al. | 379/60 |
| 4,792,948 | 12/1988 | Hangen et al. | 370/95 |
| 4,837,858 | 6/1989 | Ablay et al. | 455/54.2 |
| 5,022,024 | 6/1991 | Paneth et al. | 370/95.1 |

FOREIGN PATENT DOCUMENTS

| | | | |
|---|---|---|---|
| WO88/08648 | 11/1988 | PCT Int'l Appl. | H04B 7/14 |
| WO89/11193 | 11/1989 | PCT Int'l Appl. | H04L 25/00 |
| 2217149A | 10/1989 | United Kingdom | H04K KYR |

OTHER PUBLICATIONS

Bustillo, J., et al., "Datamovil: A Practical Implementation of Tradamo Mobile Data Transmission Protocol", May 1989 IEEE, (pp. 31-37).

Stern, H. P., "An Improved Integrated Voice/Data Mobile Radio System", Dept. of Electrical Engineering, University of Texas at Arlington, May 1900 IEEE, (pp. 311-316).

Primary Examiner—Wellington Chin
Attorney, Agent, or Firm—Dennis S. Fernandez

[57] ABSTRACT

A data communications system is overlaid on a voice-based trunked radio system. Digital data packets are transmitted over available radio channels, thereby enabling data communication between a host dispatch system and mobiles and a base station in the trunked radio system. Radio channels associated with trunked channel groups are accessed when available by a communications controller. The communications controller is configured to communicate with various mobile units of the trunked radio system over available radio channels through multiple radio communication links. Radio channels are monitored to detect when the radio channels are presently unused for voice transmission and thereby accessible for data overlay. In particular, when the data overlay system detects that the transmission of analog voice information ceases over a particular radio channel, the trunked channel group association of that particular radio channel is caused to be switched from a voice group to a data group. Data packets are then transferred over the available radio channel.

22 Claims, 3 Drawing Sheets

APPARATUS AND METHOD FOR OVERLAYING DATA ON TRUNKED RADIO

BACKGROUND OF THE INVENTION

1. Field of the Invention

This invention relates to trunked radio communication systems, particularly to data-overlaid trunked radio communication systems.

2. Description of the Background Art

Trunked radio communication systems provide simplex or half-duplex mode radio communication, typically of analog voice information, between base and mobile units over a particular geographical area through a group, or "trunk," of associated radio channels. Thus, when a transmission is made over a radio channel associated with a given trunk, base and mobile units that are tuned to other radio channels also associated with that trunk may receive the same transmission.

Due in part, however, to the intermittent nature of transmitted voice conversations, significant voice channel capacity sometimes remains unused during normal operation of trunked radio systems. Moreover, because trunked radio systems are designed primarily for handling analog voice data, trunked radio systems are not well-suited for communicating digital data, particularly data packets, frames or datagrams, according to standard digital communications protocol.

Therefore, it would be desirable to improve existing voice-based trunked radio infrastructures by overlaying thereon a data communication system for sending and receiving digital data information over unused radio channel capacity.

SUMMARY OF THE INVENTION

The invention resides in overlaying a data communications system over a voice-based trunked radio system. Digital data packets are transmitted over available radio channels, thereby enabling data communication between a host dispatch system and mobiles via a base station in the trunked radio system. Radio channels associated with trunked channel groups are accessed when available by a communications controller. The communications controller is configured to communicate with various mobile units of the trunked radio system over available radio channels through multiple radio communication links. Radio channels are monitored to detect when the radio channels are presently unused for voice transmission and thereby accessible for data overlay.

In particular, when the data overlay system detects that the transmission of analog voice information ceases over a particular radio channel, the trunked channel group association of that particular radio channel is caused to be switched from a voice group to a data group. Data packets are then transferred over the available radio channel having a data group association.

DESCRIPTION OF THE PREFERRED EMBODIMENT

Figure 1:
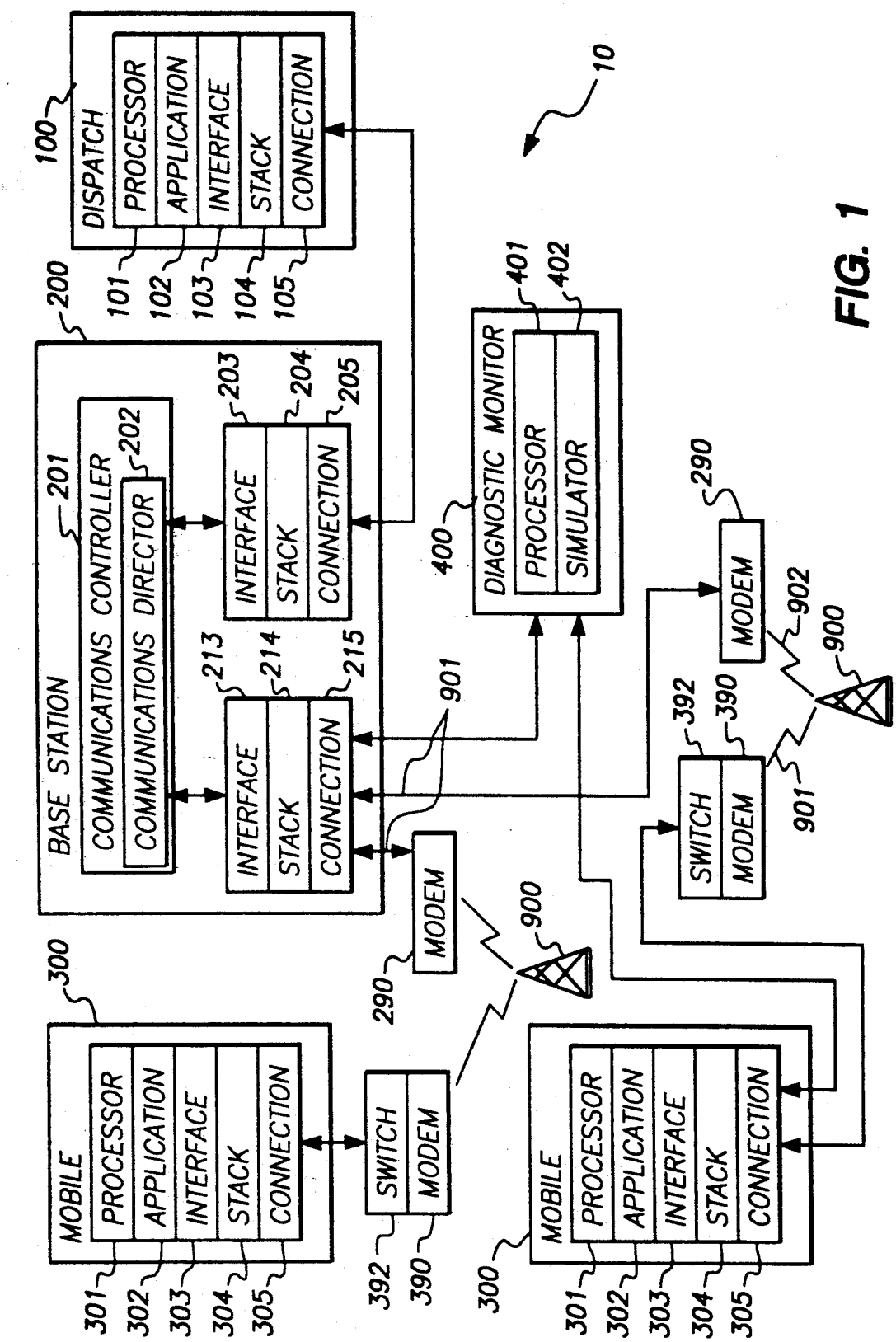
FIG. 1 is a block diagram of data-overlaid voice radio communications system 10, showing host dispatch system 100 coupled to base station 200 which is coupled to mobiles 300.

FIG. 1 shows trunked radio communications system 10 which includes mobile units 300 and a base station 200. As defined by the Federal Communications Commission (FCC), a trunked radio system is "a method of operation in which a number of radio frequency channel pairs are assigned to mobiles and base stations in the system for use as a trunk group." Thus, trunking allows radio channels to be pooled so that all users associated with the same trunked channel group have access, in simplex or half-duplex mode, to radio channels associated with the same group.

Here, mobiles 300 and base station 200 operate in cooperation with repeater station 900 compatibly per known protocol of conventional trunked radio systems, such as the Logic Trunked Radio (LTR) system available from E. F. Johnson; however, as described herein, system 10 improves upon conventional trunked radio systems by including a data overlay capability for digital packet communication. Note that it is known that repeater stations 900 serve to retransmit messages simultaneously on different frequencies but at higher power. This retransmission by repeater stations 900 located at strategic locations enables the mobile-to mobile transmission range to be extended significantly, typically by extending a 3-5 mobile transmission range up to 30-60 miles. Multiple repeater stations 900 may be interconnected with control logic to permit mobiles 300 to communicate with such multiple repeater stations 900.

In accordance with the present invention, the improvement over trunked radio systems includes overlaying thereon a means for accessing an available radio channel and a means for transferring data packets over the available radio channel. The radio channels are allocated for radio communication in simplex or half-duplex mode, and the radio channels are available for data overlay when presently unused for transmitting analog voice information or digital data.

Overlaying data communication capacity on trunked radio system 10 converts such system into a data overlay system which permits various processors 301, 101, 401, and 201 to communicate among each other by transmitting and receiving digital data messages effectively through a digital signaling network. In this networked arrangement, communications controller 201 serves as a network managing processor which permits processor 101 in host dispatch system 100 to communicate with processors 301 in mobiles 300. Moreover, such processors 301, 201 and 101 may communicate with processor 401 in diagnostic monitor 400 to exchange digital data.

Because of the intermittent nature of typical voice conversations over trunked radio systems, significant radio channel capacity frequently remains unused and available for communication of digital data. Thus, by transmitting over available radio channels data which are formatted into packets, datagrams, or frames having relatively short transmission durations (preferably under two seconds, or approximately 1.8 seconds for about a 500-character burst), the transmission of data over available radio channels has negligible or no effect on ongoing transmissions of analog voice information. Typically, analog voice conversations occur over three transmissions, each transmission being about five seconds in duration.

Figure 3:
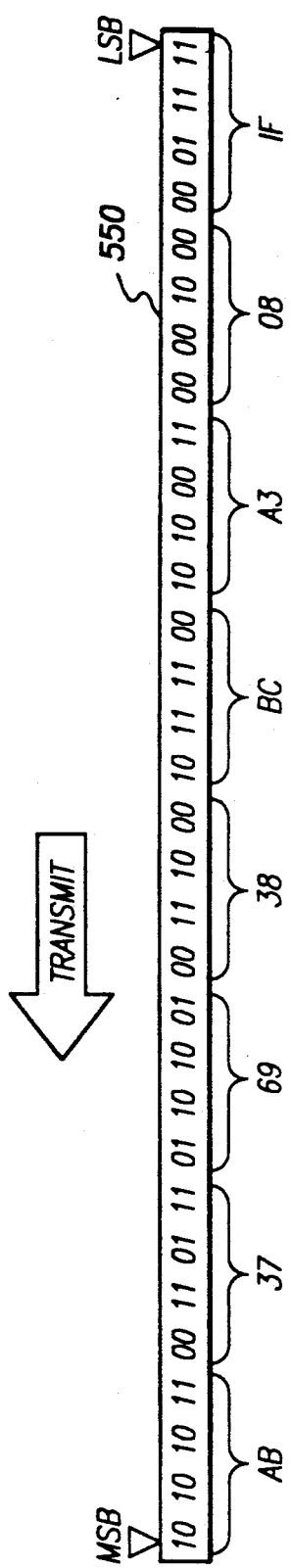
FIG. 3 is a diagram of synchronization pattern 550.
Figure 4:
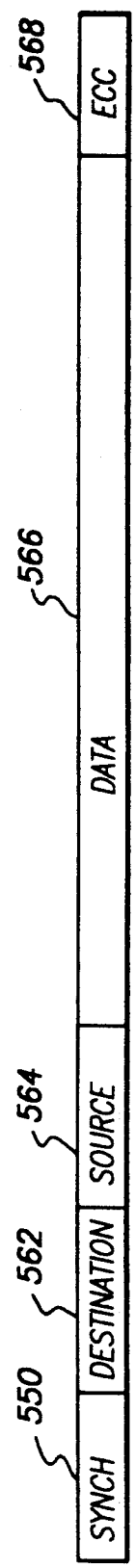
FIG. 4 is a diagram of data packet 566.

In the preferred embodiment, digital data are formatted and transmitted in discrete data frames or packets 560 as shown in FIG. 4. Each data packet 560 is configured similarly to conventional data packets, except that data packet 560 may be headed by a unique synchronization pattern 550 as shown in FIG. 3, and discussed further below. A destination field 562 and a source field 564 precedes a data field 566 in data packet 560. Error correction field 568 follows data field 566.

According to conventional trunked radio operation, each radio channel used by system 10 is associated with a trunked channel group. This association enables mobiles 300 or base station 200 tuned to radio channels associated to the same trunked channel group to receive the same transmissions on such radio channels. In this arrangement, however, only one transmission per trunked channel group may be listened to at the same time. Additionally, it is desirable to keep voice traffic in one group and data traffic in a different group, thereby avoiding simultaneous broadcast of voice and data traffic in the same group.

To enable system 10 to access available radio channels, a communications controller 201 is installed in base 200. Communications controller 201 essentially includes a processor, such as a conventional personal computer, which executes a communications director 202 software program. Communications controller 201 is configurable to enable digital data communication between various mobile units 300 over available radio channels through multiple radio communication links 901, 902.

Communications controller 201 monitors each of the radio channels in the assigned trunked channel groups to detect a particular radio channel as being available and, thus, accessible for data overlay upon the cessation of transmission of analog voice information through the particular radio channel. This detection by the communications controller 201 then causes the trunked channel group association of the available radio channel to be switched from a trunked channel group which is predefined to be used solely for analog voice transmissions to a trunked channel group which is predefined to be used solely for digital data transmissions.

When the trunked channel group association of the available radio channel is switched to the data trunked channel group, communications controller 201 transfers data packets over the available radio channel between base station 200 and mobiles 300. Thus, the communications director 202 program in communications controller 201 enables data packets to be transferred over available radio channels associated according to predefined configurations of trunked group associations such that communications controller 201 retains control over the type of information transmitted in certain trunked channel groups, i.e., voice or data. The system operator of communications controller 201 may control voice and data traffic capacity by configuring logically which trunked radio channel groups are allocated to voice or data transmissions.

Radio communication over multiple radio links between mobiles 300 and base station 200 is enabled by an adaptive radio modulator-demodulator (modem) subsystem including mobile modem 390 coupled to each mobile 300 and base modem 290 coupled to base station 200. In addition to the detailed description disclosed herein, Appendix G is hereby incorporated by reference to include further detail about modems 290, 390.

In accordance with an essential aspect of the present invention, trunked radio system 10 is arranged into a "multi-link" configuration where various mobiles 300 may communicate with host dispatch system 100 and base station 200 through multiple asynchronous serial links 901 between base modems 290 and connection 215.

Connection 215 is a conventional front-end processor, including an RS-232 interface daughter card, an 8-port interface cable and an ARTIC (Advanced Real-Time Interface Coprocessor) interface processor card based on an 80186 processor, which serves to interface between communications controller 201 and mobiles 300. The interface provided by connection 215 is scalable to permit the addition or deletion of mobiles 300. Scaling is enabled by communications director 202 in communications controller 201 which monitors and updates the present and desired configuration of mobiles 300 communicating with base station 200 and host dispatch system 100.

Switch 392 is coupled to each mobile modem 390 for indicating when one of mobile units is transmitting analog voice information over a particular radio channel. When switch 392 indicates transmission of analog voice information, the trunked channel group association of the particular radio channel is switched from the "data" group to the "voice" group. Switch 392 may be embodied in a "push-to-talk" switch coupled to the voice microphone for each mobile 300 such that when switch 392 is engaged, the transmission analog voice transmission is indicated by switch 392.

Alternatively, switch 392 may be embodied in a microphone hanger or physical relay switch coupled to each mobile 300 such that when the microphone is removed from such switch, switch 392 indicates transmission of analog voice information, and mobile modem 390 causes its radio circuitry to switch from the "data" group to the "voice" group. Thus, when switch 392 is engaged to indicate transmission of analog voice information, no digital data transmissions are permitted. However, if a portion of data is nonetheless transmitted, such data will be received and heard as an unpleasant-sounding tone, unless audibly muted by the modem.

Modems 390 are employed by the accessing means of the present data overlay system in system 10 to monitor and detect available radio channels. In this arrangement, modems 390 also serve to mute audible reception of data packet transmission received by mobiles 300 upon detection of such data packets.

To transfer data packets over available radio channels, communications controller 200 transmits bit-serially the data packets preceded by a 64-bit synchronization pattern 550. Synchronization pattern 550, which is shown in its transmitted direction in FIG. 3, includes a repeated pseudo-random code which is detectable by a receiving mobile 300 or base station 200. Synchronization pattern 550 is selected since it has good auto-correlation properties and differs significantly from actual voice patterns which would cause false triggering of the data overlay system if synchronization pattern 550 is sufficiently similar to some ordinary voice harmonics. The theoretical falsing rate on random signals is expected to be $5.4 \exp(-20)$/bit (i.e., once in 120 million years).

An auto-correlation of the pseudo-random code is performed against an uncorrupted copy of synchronization pattern 550 which is stored locally. The beginning portion, which includes the initial seven bits of the pseudo-random code, is characterized by a "dotting" or toggling binary pattern (i.e., alternating 1/0 bits) which enables the receiving mobile 300 or base station 200 to recover phase timing information about the transmitted data packet. Such phase timing information is required to reset the timing of phase lock loop circuitry which may be included in modems 290, 390. Preferably, synchronization pattern 550 consists of "AB376938-BCA3081F", in hexadecimal notation, wherein such pseudo-random code is transmitted from left to right such that "A" is transmitted first.

Detection of synchronization pattern 550 is accomplished by a 64-bit correlator at the receiving modem circuit of mobile 300 or base station 200. Detection is possible within any 64-bit permutation segment of synchronization pattern 550, in part because such pattern is transmitted repeatedly and wrapped around itself bit-serially. Although an accepted threshold for detecting the pattern is set at 64 bits (i.e., no errors allowed), a lower threshold may also be set for slightly faster detection. Once detection occurs, the data overlay system switches into the data mode and remains in that state until the logic squelch signal from the repeater goes inactive. Note that transmission of synchronization pattern 550 does not begin until mobile 300 has been granted access to an available radio channel and all contentions with other mobiles have been resolved.

Figure 2:
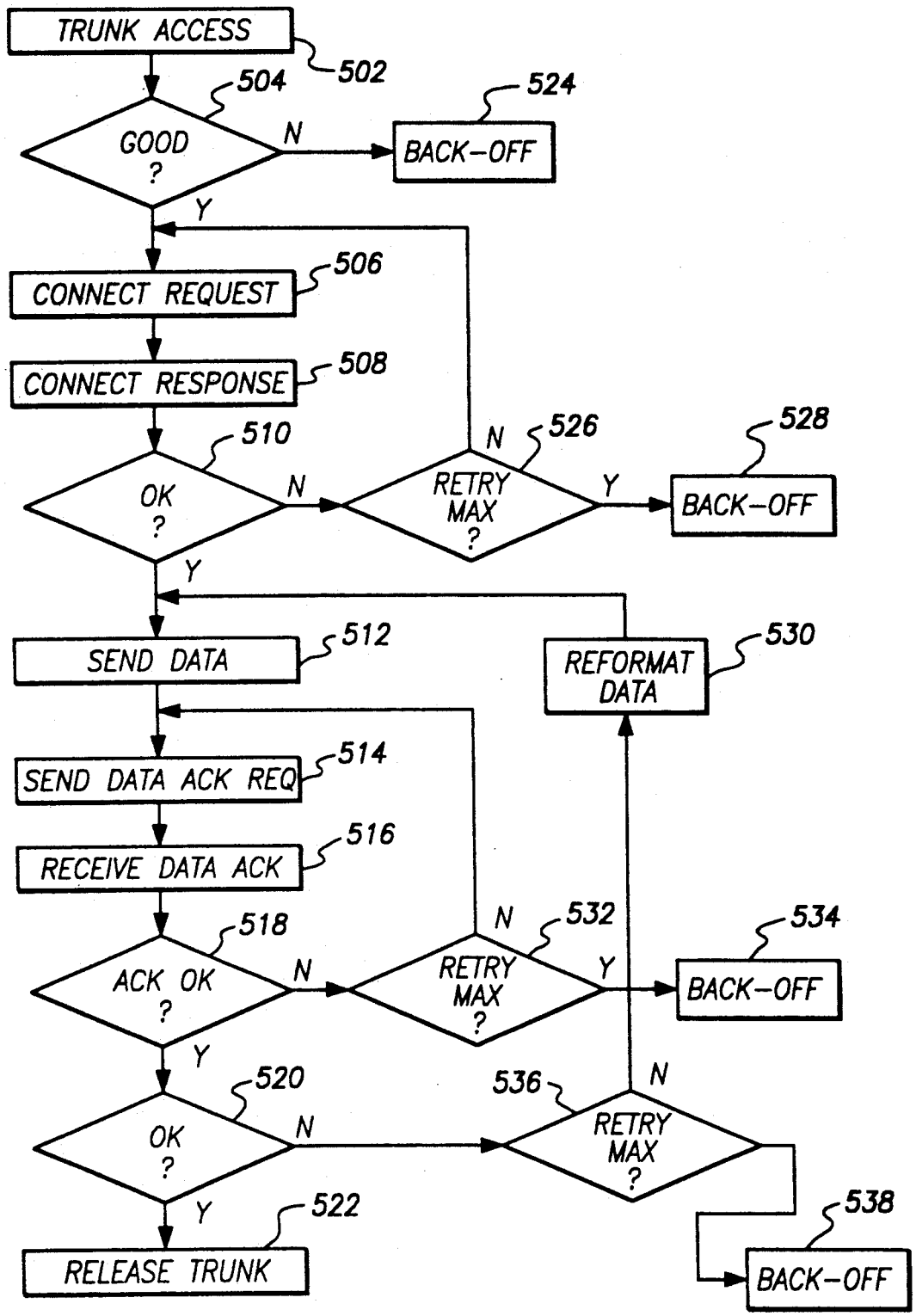
FIG. 2 is a flow chart of the data transmission protocol employed by the data overlay system.

In FIG. 2, a flow chart of data packet 560 transmission through an accessed trunk is shown. In this flow chart, the hand-shaking or signaling which occurs between mobiles 300 and base station 200 follows a master-slave or client-server relationship, which is essentially asynchronous. Although the following discussion describes the steps involved in transmitting data packet 560 from mobile 300 to base station 200, essentially the same process applies for transmitting data packet 560 from base station 200 to mobile 300. To a significant extent, the decision-making logic which is used to control the following process resides in an 80188 processor included in each modem 390, 290.

Initially, conventional interchange between mobile modem 390 and trunked radio system 10 (i.e., E. F. Johnson trunking protocol) occurs for mobile 300 to gain physical access to a given trunk channel group at step 502. If such access fails, however, at decision step 504, then a back-off algorithm at step 524 is initiated which retries access to the trunk group at exponential or nonlinearly-increasing durations, thereby minimizing trunk access collisions with other system users. The back-off algorithm is invoked when the data overlay system determines that data is unacknowledged, data is corrupted, the allocated available channel is busy, or the trunk is busy with different actions based on traffic conditions. To randomize collisions of access attempts, the back-off algorithm further provides a random variable within an upper and a lower limit, wherein the successive retry durations are determined as a function of such random variable which is bit-shifted left by one bit for each successive retry.

A connect request packet is sent by mobile modem 590 at step 506. This connect request packet is preceded by synchronization pattern 550. Then, a connect response packet from the system controller of trunked system 10 should be received at step 508 to acknowledge step 506. At decision step 510, if the connect response is not received by mobile 300, then connect request packet is resent up to a maximum number of attempts as indicated at decision step 526. When such retry maximum is reached, then back-off algorithm at step 528 is initiated as similarly described at step 524. However, if connect request is received by mobile 300, then an available radio channel is obtained and data packet 560 may be sent therein, preceded by synchronization pattern 550, at step 512.

In accordance with an important aspect of the present invention, transmission of data packet 560 at step 512 achieves data overlay on voice trunked system 10. When data packet 560 is transmitted, other members associated with the same trunked radio channel group as transmitting mobile 300 (i.e., other mobiles 300 and base station 200) receive data packet 560. At step 512, such trunked radio channel group would have been switched from the "voice" group to the "data" group as discussed herein. Preferably, the transmission of data packet 560, which is predefined to be of particular "small" size, will result in no or negligible loading on the performance profile of analog voice transmission over a given trunked radio channel for trunked radio system 10.

Preferably, data packet 560 is formatted into bit-interleaved blocks for radio transmission. In this arrangement, data field 566, which typically contains 1,500 bytes of digital data, is segmented into a number of sequential 16-byte blocks. Such 16-byte blocks are then ordered vertically such that the column numbers associated with each bit in the 16-byte blocks are aligned. Thus, for instance, sequential blocks A, B and C respectively having bits A1, A2 ... An; B1, B2 ... Bn; and C1, C2 ... Cn are arranged (at least conceptually, where n is the last bit in 16 bytes of data) as follows:

Block A: A1 A2 A3 A4 An
Block B: B1 B2 B3 B4 Bn
Block C: C1 C2 C3 C4 Cn

To achieve bit interleaving of the 16-byte blocks, sequential columns are transmitted bit-serially. In the above example, bit-interleaving of blocks A, B and C would result in the following digital transmission:

A1 B1 C1 A2 B2 C2 A3 B3 C3 ... An Bn Cn

Of course, once such bit-interleave coded data is received by either mobile 300 or base station 200, such data would be decoded to restore the proper bit sequence of each 16-byte block. In addition to providing the effect of data encryption, bit interleaving facilitates forward error correction of the transmitted data blocks, particularly when transmission fading causes bits to be lost.

After data packet 560 is sent, a request for data acknowledgment is transmitted by transmitting mobile 300 over the available radio channel at step 514. This data acknowledgment request is preceded by synchronization pattern 550. A data acknowledgment packet should be received at step 516 to acknowledge step 514 and receipt of data packet 560. But while the transferred data packet 560 is unacknowledged, as tested at decision step 518, the data acknowledgment request is resent up to a specified number of resend attempts at decision step 532. When the number of attempts to resend the data acknowledgment request exceeds the specified number without acknowledgment, the data acknowledgment request is resent at step 534 according to the back-off algorithm described herein.

If data acknowledgment request is not confirmed at decision step 518 as tested at decision step 518, another retry sequence is attempted up to a predefined maximum count at decision step 536; however, data packet 560 may now be re-formatted at step 530 according to an alternate data coding scheme, such as bit-interleaving. Again, if this maximum count is reached without data acknowledgement, the back-off algorithm is invoked at step 538. Finally, if decision step 520 determines that a data acknowledgment has been received, then the trunk is released at step 522.

To facilitate the transfer of data packets between mobiles 300, base station 200, and host dispatch system 100, digital data contained in such packets are assembled as a run-time routine known as a Remote Procedure Call (RPC) for peer-to-peer or client-server based communication according to Open Systems Interconnect (OSI) stack hierarchy. In the present system 10, RPC routines are communicated at the Logical Link Control (LLC) sublayer and the Medium Access Control (MAC) sublayer according to OSI protocol. In this regard, users or applications programmers of processors 301, 201, 101, or 401 are provided with a common programming language and operating system command interface at the application sublayer of the OSI stack hierarchy. In addition to the detailed description disclosed herein, Appendices A through F are hereby incorporated by reference to include further detail about the software architecture, particularly the system commands and applications programming interfaces employed for the present embodiment.

At the application sublayer, application interfaces 303, 203, 213, 103 are provided which each include a predefined command set that is available symmetrically to users of mobiles 300 and host dispatch system 100, as well as of communications controller 201. The predefined command set includes user commands for sending and receiving data messages to and from said mobiles 300, as well as user commands for listing status about mobiles 300, host dispatch system 100 and users of mobiles 300 and host dispatch system 100.

Thus, to users or applications programmers of processors 301, 101, 201, the application interface 303, 203, 213, 103 appears "standard" to the extent that such users or applications programmers need not re-learn a different applications environment for each such interface. In this regard various software code or applications 302 may be written or developed which would function equivalently when applied at interfaces 303, 213, 203, 103.

Furthermore in accordance with known OSI protocol, application interfaces 202, 213, 103 reside directly on hierarchical stacks 304, 214, 204, 104 of predefined OSI sublayers, wherein such stacks 304, 214, 204, 104 are coupled to device or hardware connections 305, 215, 205, 105. In the present invention, connection 215 is a multi-link front-end processor which provides serial asynchronous links between connection 215 and base modems 290. In mobiles 300, connections 305 are coupled through asynchronous serial lines to modems 390, optionally through switch 392. Pursuant to conventional trunked radio operation, modems 290, 390 communicate through repeater stations 900.

Host dispatch system 100 may be a single digital computer or a combination of digital computers networked together according to known computer networking practice. Connection 205 of base station 200 is coupled to connection 105 of host dispatch system 100 according to conventional methods for interconnecting networked digital computers for data transfer. In conjunction with trunked radio system 10, host dispatch system 100 may serve as a central dispatch controller for communicating or broadcasting digital data messages, as well as analog voice messages to various mobiles 300 traveling within a given geographical radio coverage area. For instance, host dispatch system 100 may communicate such messages with mobiles 300 for medical emergency or package delivery purposes.

Optionally, diagnostic monitor 400 is remotely coupled to base station 200. Diagnostic monitor 400 includes processor 401 which is a personal computer configured to run a simulator program 402 which simulates the functional and behavioral operation of trunked system 10. In addition, diagnostic monitor 400 monitors actual access wait times for transmission of analog voice and digital data information through trunked radio system 10. Statistical data about such monitored access wait times is accumulated as a function of data packet transmission duration times.

When configured in a simulation mode, diagnostic monitor 400 executes simulator 402 to predict data overlay performance as a function of the performance profile of either the monitored actual access wait times or other hypothetical transmission conditions such as data packet size and number of trunked channel groups allocated to voice or data. Such simulation enables operating parameters of trunked radio system 10 to be altered according to predicted data overlay performance.

In a particular configuration of trunked radio system 10 designed for multiple regional coverage, diagnostic monitor 400 determines the traffic capacity and functional performance of the system 10 wherein mobiles 300 roam freely between adjacent geographical regions covered by different base stations 200. In addition to the detailed description disclosed herein, Appendices H through J are hereby incorporated by reference to include further detail about diagnostic monitor 400 and the multi-regional configuration.

We claim:

1. In a trunked radio communication system including a plurality of mobile units communicating analog voice information with a base unit over radio channels associated with trunked channel groups in simplex or half-duplex mode, an apparatus for providing data overlay capability for digital packet communication between a host dispatch system and said mobile units of said trunked radio communication system via said base station, said apparatus comprising:

accessing means for accessing an available radio channel associated with one of said trunked channel groups, said accessing means including a communications controller coupled to said data base unit and to each of said mobile units, said communications controller being configurable to communicate with said mobile units over said available radio channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring means, coupled to said accessing means and said host dispatch system, for transferring data packets over said available radio channel between said base unit and said mobile units when the trunked channel group association of said available radio channel is switched to said data group;

wherein said accessing means mutes audible reception of such data packet transmission received at said mobile units when said accessing means detects data packet transmission over said available radio channel.

2. In a trunked radio communication system including a plurality of mobile units communicating analog voice information with a base unit over radio channels associated with trunked channel groups in simplex or half-duplex mode, an apparatus for providing data overlay capability for digital packet communication between a host dispatch system and said mobile units of said trunked radio communication system via said base station, said apparatus comprising:

accessing means for accessing an available radio channel associated with one of said trunked channel groups, said accessing means including a communications controller coupled to said data base unit and to each of said mobile units, said communications controller being configurable to communicate with said mobile units over said available radio channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring means, coupled to said accessing means and said host dispatch system, for transferring data packets over said available radio channel between said base unit and said mobile units when the trunked channel group association of said available radio channel is switched to said data group and said transferring means transfers said data packets bit-serially over said available radio channel, each such transferred data packet being preceded bit-serially by a synchronization pattern transferred by said transferring means;

said synchronization pattern includes a repeated pseudo-random code which is detectable by a receiving mobile unit or receiving base unit by autocorrelation of said pseudo-random code.

3. The apparatus of claim 2 wherein:

a beginning portion of said pseudo-random code includes a toggling binary pattern which enables said receiving mobile unit or said receiving base unit to recover phase timing information.

4. The apparatus of claim 2 wherein:

said pseudo-random code, in hexadecimal notation, consists of "AB376938BCA3081F", such pseudo-random code being transmitted from left to right whereby "A" is transmitted first.

5. In a trunked radio communication system including a plurality of mobile units communicating analog voice information with a base unit over radio channels associated with trunked channel groups in simplex or half-duplex mode, an apparatus for providing data overlay capability for digital packet communication between a host dispatch system and said mobile units of said trunked radio communication system via said base station, said apparatus comprising:

accessing means for accessing an available radio channel associated with one of said trunked channel groups, said accessing means including a communications controller coupled to said data base unit and to each of said mobile units, said communications controller being configurable to communicate with said mobile units over said available radio channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring means, coupled to said accessing means and said host dispatch system, for transferring data packets over said available radio channel between said base unit and said mobile units when the trunked channel group association of said available radio channel is switched to said data group;

wherein after transferring each said data packet, said transferring means sends over said available radio channel a request for data acknowledgment, said data acknowledgment request being preceded by said synchronization pattern, said data acknowledgment request being resent up to a specified number of resend attempts by said transferring means while the transferred data packet is unacknowledged.

6. The apparatus of claim 5 wherein:

when the number of attempts by said transferring means to resend said data acknowledgment request exceeds said specified number without acknowledgment, said transferring means resends said data acknowledgment request at non-linear backed-off time intervals for a predetermined period while the transferred data packet is unacknowledged.

7. In a trunked radio communication system including a plurality of mobile units communicating analog voice information with a base unit over radio channels associated with trunked channel groups in simplex or half-duplex mode, an apparatus for providing data overlay capability for digital packet communication between a host dispatch system and said mobile units of said trunked radio communication system via said base station, said apparatus comprising:

accessing means for accessing an available ratio channel associated with one of said trunked channel groups, said accessing means including a communications controller coupled to said data base unit and to each of said mobile units, said communications controller being configurable to communicate with said mobile units over said available radio channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring means, coupled to said accessing means and said host dispatch system, for transferring data packets over said available radio channel between said base unit and said mobile units when the trunked channel group association of said available radio channel is switched to said data group;

wherein said transferred data packets contain digital data which are communicated between said mobile units and said host dispatch system through said base unit, such communicated digital data being assembled as a Remote Procedure Call (RPC) for communication according to Open Systems Interconnect (OSI) stack hierarchy, wherein said RPC is communicated at a Logical Link Control (LLC) sublayer and a Medium Access Control (MAC) sublayer of said OSI stack hierarchy.

8. The apparatus of claim 7 wherein:

said data communication between said mobile units and said host dispatch system through said base unit is conducted by said transferring means at the application sublayer of said OSI stack hierarchy to facilitate host connectivity, wherein an application interface including a predefined command set is available symmetrically to users of said mobile units and to users of said host dispatch system.

9. The apparatus of claim 8 wherein:

said command set includes user commands for sending and receiving data user messages to and from said mobile units.

10. The apparatus of claim 8 wherein:

said command set includes user commands for listing status about said mobile units, said host dispatch system and said users of said mobile units and said host dispatch system.

11. In a trunked radio communication system including a plurality of mobile units communicating analog voice information with a base unit over radio channels associated with trunked channel groups in simplex or half-duplex mode, an apparatus for providing data overlay capability for digital packet communication between a host dispatch system and said mobile units of said trunked radio communication system via said base station, said apparatus comprising:

accessing means for accessing an available radio channel associated with one of said trunked channel groups, said accessing means including a communications controller coupled to said data base unit and to each of said mobile units, said communications controller being configurable to communicate with said mobile units over said available radio channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group;

transferring means, coupled to said accessing means and said host dispatch system, for transferring data packets over said available ratio channel between said base unit and said mobile units when the trunked channel group association of said available radio channel is switched to said data group; and diagnosing means, remotely coupled to said accessing means, for monitoring access wait times for transmission of analog voice and digital data information, said diagnosing means accumulating statistical data of said monitored access wait times as a function of data packet transmission during times, said diagnosing means simulating the functionality of said trunked radio communication system to predict data overlay performance as a function of the profile of said monitored access wait times, thereby enabling operating parameters of said trunked radio system to be altered according to said predicted data overlay performance.

12. In a trunked radio communication system including a plurality of mobile units communicating analog voice information with a base unit over radio channels associated with trunked channel groups in simplex or half-duplex mode, a method for providing data overlay capability for digital packet communication between a host dispatch system and said mobiles in said trunked radio communication via said base unit, said method comprising the steps of:

accessing an available radio channel associated wit one of said trunked channel groups, said accessing step includes providing a communications controller coupled to said base unit and to each of said mobile units wherein said communications controller is configurable to communicate with said mobile units over said available channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group, wherein said accessing step further includes muting audible reception of the data packet transmission received at said mobile units when such data packet transmission is detected over the available radio channel; and transferring data packets over said available radio channel between said base unit and said mobile units when the trunked channel group association of said available radio channel is switched to said data group.

13. In a trunked radio communication system including a plurality of mobile units communicating analog voice information with a base unit over radio channels associated with trunked channel groups in simplex or half-duplex mode, a method for providing data overlay capability for digital packet communication between a host dispatch system and said mobiles in said trunked radio communication via said base unit, said method comprising the steps of:

accessing an available radio channel associated with one of said trunked channel groups, said accessing step includes providing a communications controller coupled to said base unit and to each of said mobile units wherein said communications controller is configurable to communicate with said mobile units over said available channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring data packets over said available radio channel between said base unit and said mobile units when the trunked channel group association of said available radio channel is switched to said data group, the data packets being transferred bit-serially over the available ratio channel, each such transferred data packet being preceded bit-serially by a synchronization pattern including a repeated pseudo-random code which is detectable by autocorrelation of the pseudo-random code.

14. The method of claim 13 wherein:
a beginning portion of the pseudo-random code includes a toggling binary pattern which enables the receiving mobile unit or the receiving base unit to recover phase timing information.

15. The method of claim 13 wherein:
the pseudo-random code, in hexadecimal notation, consists of "AB376938BCA3081F", such pseudo-random code being transmitted from left to right whereby "A" is transmitted first.

16. In a trunked radio communication system including a plurality of mobile units communicating analog voice information with a base unit over radio channels associated with trunked channel groups in simplex or half-duplex mode, a method for providing data overlay capability for digital packet communication between a host dispatch system and said mobiles in said trunked radio communication via said base unit, said method comprising the steps of:

accessing an available radio channel associated with one of said trunked channel groups, said accessing step includes providing a communications controller coupled to said base unit and to each of said mobile units wherein said communications controller is configurable to communicate with said mobile units over said available channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring data packets over said available radio channel between said base unit and said mobile units when the trunked channel group association of said available radio channel is switched to said data group; after transferring each said data packet, a request for data acknowledgment is sent over the available radio channel, the data acknowledgment request being preceded by the synchronization pattern, the data acknowledgment request being resent up to a specified number of resend attempts while the transferred data packet is unacknowledged.

17. The method of claim 16 wherein:
when the number of attempts to resend the data acknowledgment request exceeds the specified number without acknowledgment, the data acknowledgment request is resent at nonlinear backed-off time intervals for a predetermined period while the transferred data packet is unacknowledged.

18. In a trunked radio communication system including a plurality of mobile units communicating analog voice information with a base unit over radio channels associated with trunked channel groups in simplex or half-duplex mode, a method for providing data overlay capability for digital packet communication between a host dispatch system and said mobiles in said trunked radio communication via said base unit, said method comprising the steps of:

accessing an available radio channel associated with one of said trunked channel groups, said accessing step includes providing a communications controller coupled to said base unit and to each of said mobile units wherein said communications controller is configurable to communicate with said mobile units over said available channel through multiple radio communication links, said communications controller monitoring each of the radio channels is said trunked channel groups to detect said available radio channel as being accessible for data overlay upon the cessation of transmission of analog voice information through said available radio channel, such detection causing said accessing means to switch the trunked channel group association of said available radio channel from a voice group to a data group; and transferring data packets over said available radio channel between said base unit and said mobile units when the trunked channel group association of said available radio channel is switched to said data group, the transferred data packets containing digital data which are communicated between the mobile units and the host dispatch system through the base unit, such communicated digital data being assembled as a Remote Procedure Call (RPC) for communication according to Open Systems Interconnect (OSI) stack hierarchy, wherein the RPC is communicated at a Logical Link Control (LLC) sublayer and a Medium Access Control (MAC) sublayer of the OSI stack hierarchy.

19. The method of claim 18 wherein:
the data communication between the mobile units and the host dispatch system through the base unit is conducted at the application sublayer of the OSI stack hierarchy to facilitate host connectivity, wherein an application interface including a predefined command set is available symmetrically to users of the mobile units and the users of the host dispatch system.

20. The method of claim 19 wherein:
the command set includes user commands for sending and receiving data user messages to and from the mobile units.

21. The method of claim 19 wherein:
the command set includes user commands for listing status about the mobile units, the host dispatch system and the users of the mobile units and the host dispatch system.

22. In a trunked radio communication system including a plurality of mobile units communicating analog voice information with a base unit over radio channels associated with trunked channel groups in simplex or half-duplex mode, a method for providing data overlay capability for digital packet communication between a host dispatch system and said mobiles in said trunked ratio communication via said base unit, said method comprising the steps of:

accessing an available radio channel associated with one of said trunked channel groups, said accessing step includes providing a communications controller coupled to said base unit and to each of said mobile units wherein said communications controller is configurable to communicate wit said mobile units over said available channel through multiple radio communication links, said communications controller monitoring each of the radio channels in said trunked channel groups to detect said available radio channel as being accessible for data overlay upon the cessation of transmission of analog voice information through said available radio channel, such detection causing said accessing means to switch the trunked channel group association of said available radio channel from a voice group to a data group;

transferring data packets over said available radio channel between said base unit and said mobile units when the trunked channel group association of said available radio channel is switched to said data group; and monitoring access wait times for transmission of analog voice and digital data information, statistical data of the monitored access wait times being accumulated as a function of data packet transmission duration times, the functionality of the trunked radio communication system being simulated to predict data overlay performance as a function of the profile of the monitored access wait times, thereby enabling operating parameters of the trunked radio system to be altered according to the predicted overlay performance.

* * * * *